(12) United States Patent
Wendler et al.

(10) Patent No.: US 7,856,940 B2
(45) Date of Patent: Dec. 28, 2010

(54) CONTROL MODULE FOR A NOZZLE ARRANGEMENT

(75) Inventors: Thomas Wendler, Karlsdorf-Neuthard (DE); Edmar Link, Karlsruhe (DE)

(73) Assignee: Microjet GmbH, Karlsruhe (DE)

( * ) Notice: Subject to any disclaimer, the term of this patent is extended or adjusted under 35 U.S.C. 154(b) by 1430 days.

(21) Appl. No.: 11/272,075

(22) Filed: Nov. 14, 2005

(65) Prior Publication Data

US 2006/0144967 A1 Jul. 6, 2006

(30) Foreign Application Priority Data

Nov. 18, 2004 (DE) ........................ 10 2004 055 737

(51) Int. Cl.
*B05C 5/00* (2006.01)
*B65D 83/14* (2006.01)
*F23D 14/62* (2006.01)
*B23B 51/06* (2006.01)

(52) U.S. Cl. ...................... 118/300; 239/419.3; 407/11; 408/61; 222/402.18

(58) Field of Classification Search ................ 408/1 R, 408/56, 61; 184/50.2; 407/11; 118/300; 222/402.18, 402.25; 239/418, 419, 419.3
See application file for complete search history.

(56) References Cited

U.S. PATENT DOCUMENTS

| | | | | | |
|---|---|---|---|---|---|
| 3,104,826 | A | * | 9/1963 | Morris | ........................ 239/413 |
| 3,570,332 | A | * | 3/1971 | Beake . | ........................ 82/1.11 |
| 4,467,943 | A | * | 8/1984 | Carse | ........................ 222/309 |
| 5,226,506 | A | | 7/1993 | Link | |
| 2003/0123940 | A1 | * | 7/2003 | Hubbard et al. | ............. 408/1 R |

FOREIGN PATENT DOCUMENTS

| | | |
|---|---|---|
| DE | 37 43 968 C1 | 12/1988 |
| DE | 201 12 812 U1 | 11/2001 |
| DE | 102 22 863 C1 | 11/2003 |

* cited by examiner

*Primary Examiner*—Yewebdar T Tadesse
(74) *Attorney, Agent, or Firm*—Duane Morris, LLP

(57) ABSTRACT

A control module for a nozzle arrangement, including at least one two-component nozzle for spraying a gas/liquid mixture on the zones of action between a tool and a workpiece is characterized by a gas supply line for pressurized air and a liquid supply line for pressurized liquid, both leading to the two-component nozzle, a liquid check valve in the liquid supply line, a control device to be actuated by the pressurized gas for opening or closing of the liquid check valve, a packing disposed downstream of the liquid check valve, a branch line in the form of a capillary tube extending from the packing to the or each two-component nozzle.

24 Claims, 3 Drawing Sheets

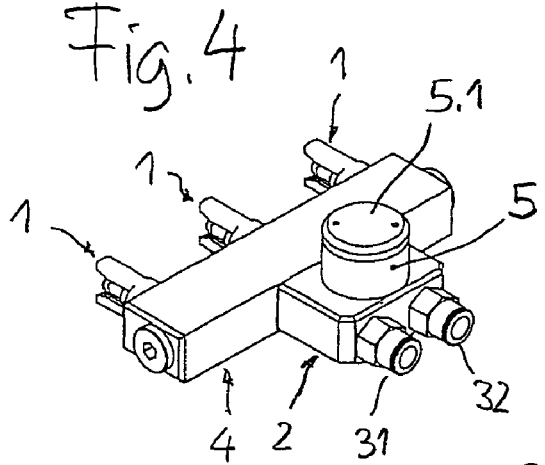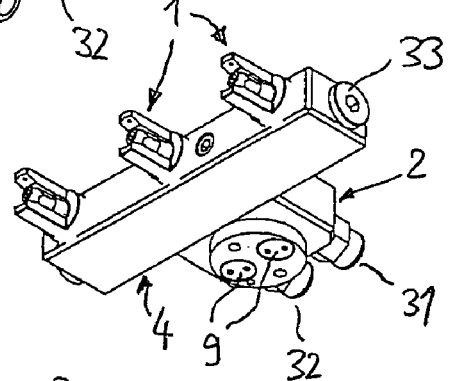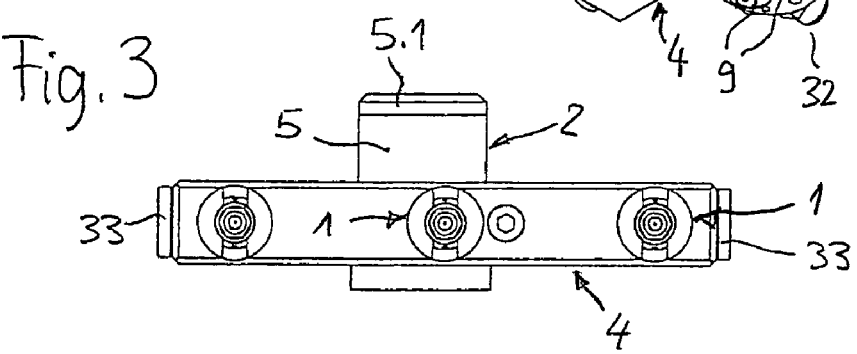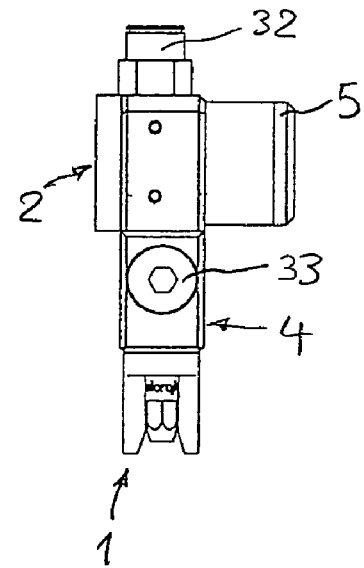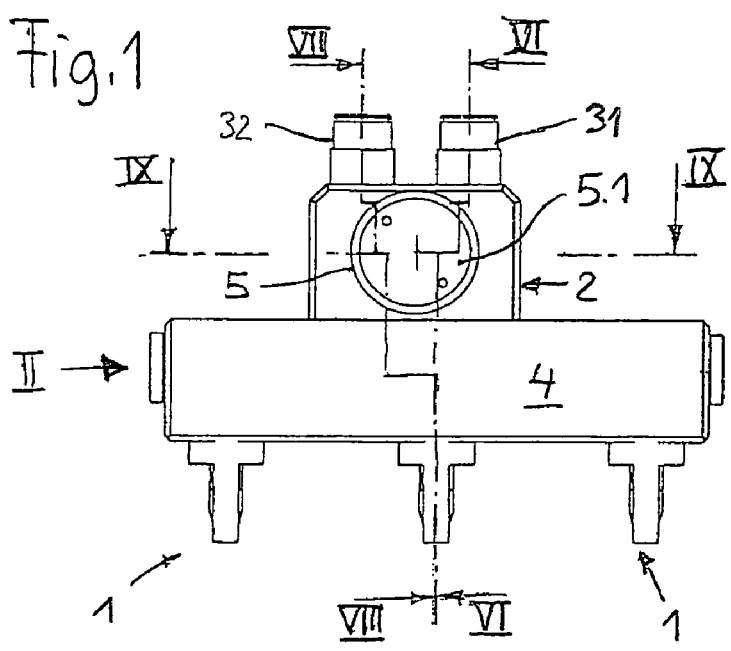

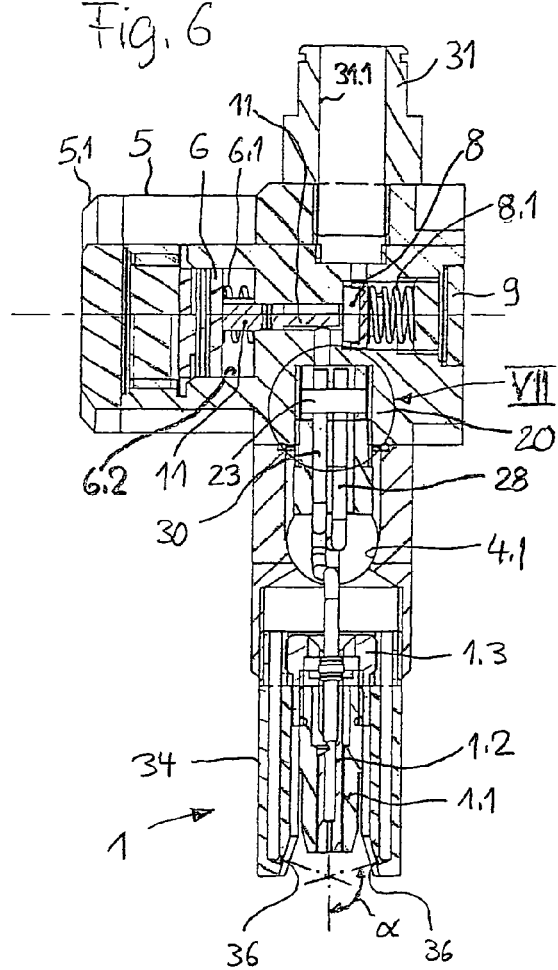
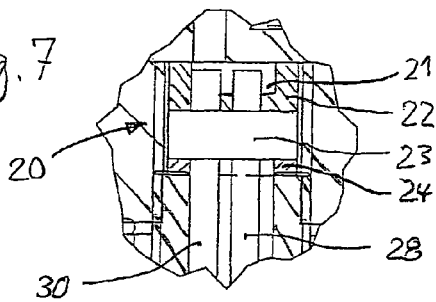
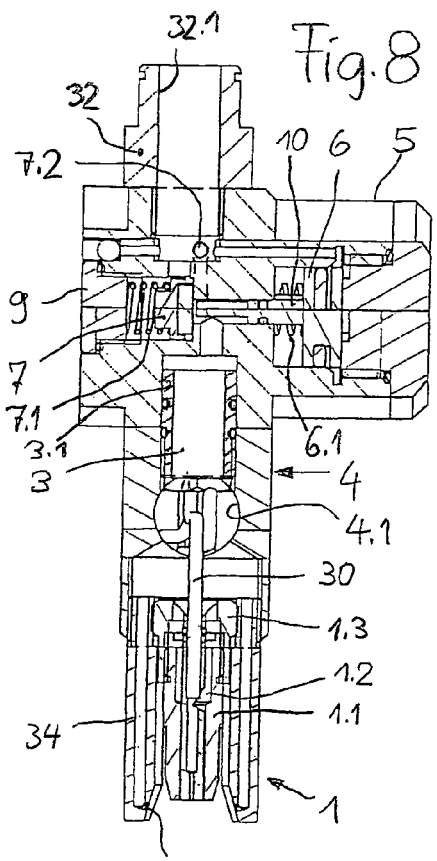
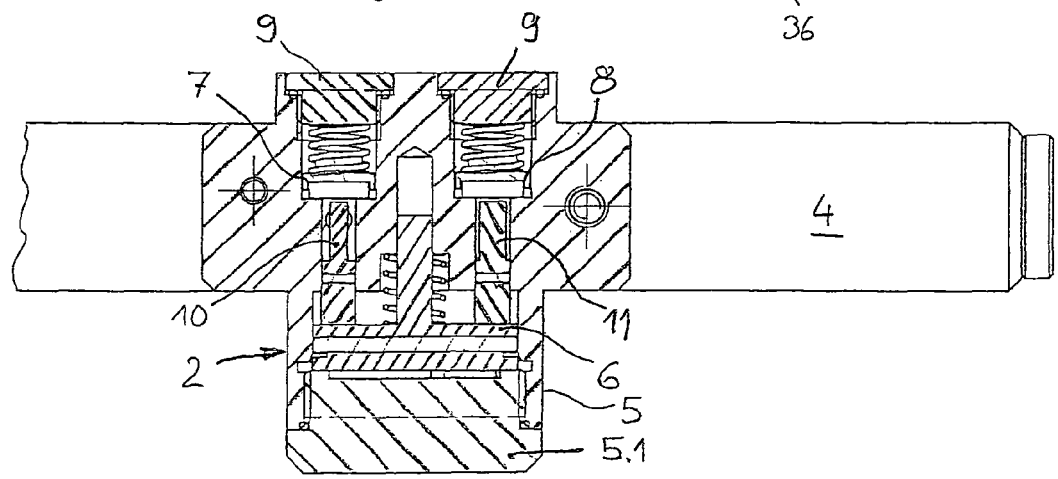

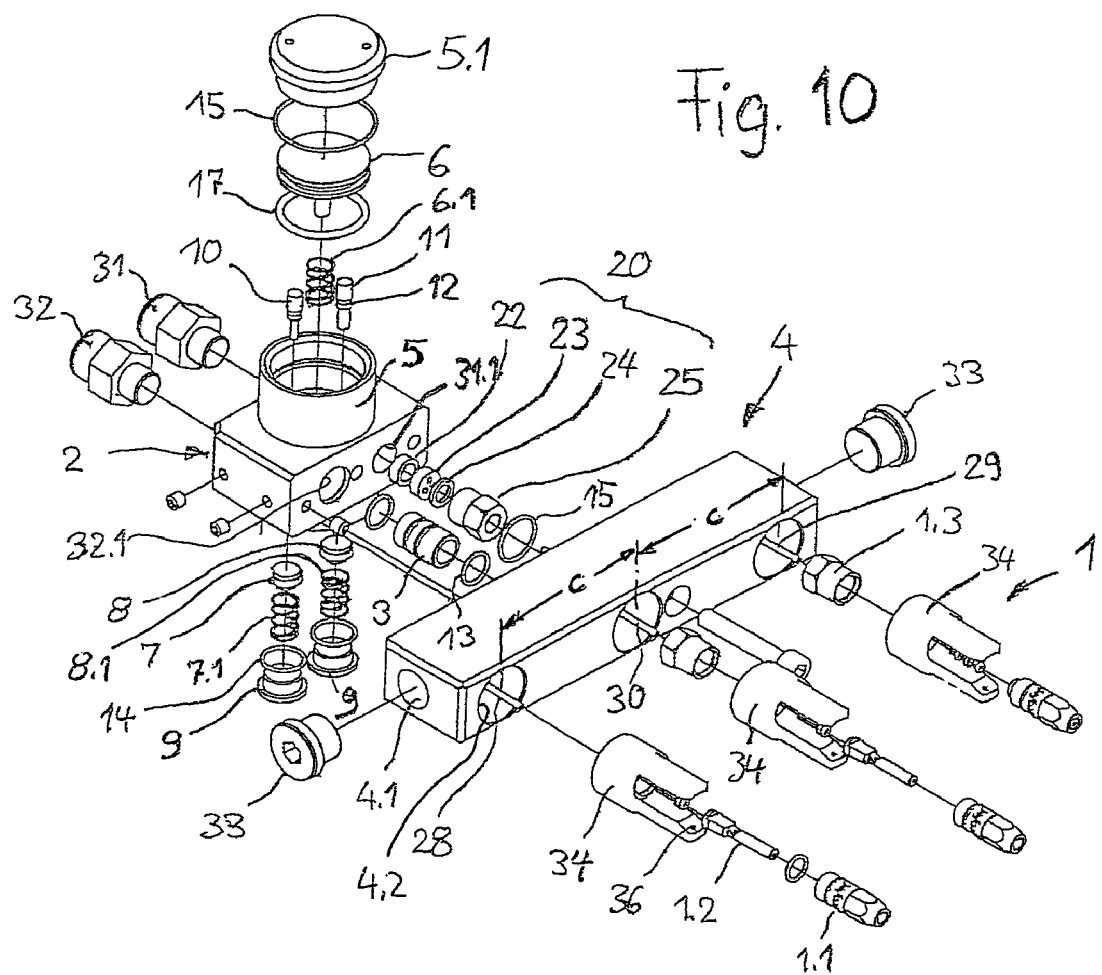

CONTROL MODULE FOR A NOZZLE ARRANGEMENT

FIELD OF THE INVENTION

The instant invention relates to a nozzle arrangement, including two-component nozzles for spraying a gas/liquid mixture on the zones of action between a tool and a workpiece.

PRIOR ART

A measure typically used to reduce friction between a shaping tool and a workpiece surface, such as the surface of sheet material subjected to bending or punching, consists in applying an oil film on the workpiece surface prior to the deformation process by means of a roller system which comprises two coaxially oriented coating rollers. It is difficult with this method to achieve oil films of defined thin thickness. Rather, the thickness of the oil film, on the one hand, turns out to be non-uniform and, therefore, locally inadequate for obtaining the desired frictional relationships and, on the other hand, oil consumption is high.

Different materials require the use of different quality oils. Therefore, a change of material of the workpiece or sheet to be shaped or deformed makes it necessary to change the coating rollers for application of the oil film. That is not only time consuming but also requires stock keeping of different rollers in a roller depot.

Another method already used in practice provides for applying the friction reducing oil on the workpiece surface by means of spray nozzles. Such spray nozzles, however, atomize the oil and that poses a health risk to the operating staff. Expensive suction equipment, therefore, must be installed and that in turn leads to high oil consumption.

Also when subjecting workpieces to cutting operations, especially in processing centers which comprise a plurality of tool spindles, lubricating oil must be introduced into the zone of action between the cutting tool and the workpiece. If two-component nozzles are used for spraying of a gas/liquid mixture that likewise may lead to fine dispersion of the cooling lubricant oil being sprayed.

A per se known minimum quantity cooling lubricating apparatus comprising two-component nozzles avoids health threatening atomization during operation (DE 37 43 968 C1, DE 102 22 863 C1).

SUMMARY OF THE INVENTION

It is, therefore, an object of the invention to provide a control module and the use of such control module to generate a uniform thin liquid film to be applied on the surface of a workpiece to be shaped by a shaping tool, e.g. a bending tool, or on the zone of action between a workpiece surface to be cut or milled and a respective cutting or milling tool.

A further object of the present invention is to avoid the generation of health damaging oil mist and thereby avoid expensive suction equipment.

These and other objects are accomplished by a control module comprising the features of claims 1 and 19, respectively, directed to a control module; and to the use of such control module as claimed in claims 14, 22 and 23, respectively.

Advantageous modifications of the invention and preferred usage thereof are recited in the subclaims.

A control module according to claim 1 allows the liquid film sprayed on the workpiece surface by means of the two-component nozzles to be obtained in simple manner in any desired width and thickness of the liquid film by way of pneumatically controlling the control device.

Employing two-component nozzles according to DE 37 43 968 C1, especially according to DE 102 22 863 C1, means that the spraying is accomplished practically without generation of oil mist, in other words atomization so that expensive suction equipment is unnecessary. The consumption of liquid can be kept at a minimum.

The control module according to the invention permits quick changeover to a different liquid (type of oil) adapted to the particular metal of the workpiece to be deformed, without any need to exchange parts. The materials may be metals of any kind from light metals to steel.

Response times are short and dripping after switch-off positively is prevented by virtue of the provision of a liquid volume limiter, preferably of annular shape, in the stuffing box.

The invention will be described further, by way of example, with reference to the accompanying drawings, in which:

SHORT DESCRIPTION OF THE DRAWINGS

FIGS. 1 to 5 show different views of a control module according to the invention, more specifically:

FIG. 1 is a top plan view;

FIG. 2 is a side elevation in the direction of arrow II in FIG. 1;

FIG. 3 is a front elevation;

FIG. 4 is a perspective view from above;

FIG. 5 is a perspective view from below;

FIG. 6 shows a section along lines VI-VI in FIG. 1;

FIG. 7 shows a detail at VII in FIG. 6;

FIG. 8 shows a section along lines VIII-VIII in FIG. 1;

FIG. 9 shows a section along lines IX-IX in FIG. 1; and

FIG. 10 is an exploded view of the control module shown in FIGS. 1 to 9.

DESCRIPTION OF A PREFERRED EMBODIMENT

The control module illustrated in the figures comprises a module body 2 and a nozzle casing 4 firmly connected to the same.

The nozzle casing 4 is formed with a throughbore 4.1 extending in longitudinal direction of the nozzle casing and being closed at both ends by closure plugs 33. Parallel nozzle take-up bores 4.2 intersecting the throughbore 4.1 are provided in line at uniform spacings c. Each bore 4.2 takes up a two-component nozzle 1, comprising a nozzle shell 1.1, a nozzle core 1.2, and an air jacket generator 1.3 each. Thus far, each two-component nozzle is conform with a two-component nozzle as specified in DE 102 22 863 C1. In addition, each two-component nozzle 1 is surrounded by a jet forming attachment 34 including two diagonally opposed jet forming nozzles 36 oriented at an angle alpha of between 90° and 120° with respect to the longitudinal axis of each two-component nozzle and directed at the mixed jet exiting from the two-component nozzle so as to press the mixed jet flat such that the two mixed jets issuing from two adjacent two-component nozzles will contact or over-lap each other.

The generation of mixed oil/air jets as well as the structure and function of the two-component nozzle 1 are described in detail in DE 37 43 968 C1 and DE 102 22 863 C1 to which reference is made here.

Each module body 2 has an oil connection 31 embodied by a plug-in screwed joint for an oil supply hose and an air connection 32 embodied by a plug-in screwed joint for an air supply hose. The two connections 31, 32 are disposed in parallel with the two-component nozzles 1. Transversely thereof, the module body 2 includes a cylinder 5 with a cylinder cover 5.1, and a control piston 6 is movable against the pressure of a compression spring 6.1 within a bore 6.2 inside the cylinder. The control piston 6 is adapted to be actuated by gas, preferably air supplied through the plug-in screwed joint 32 and being directed to the top of the control piston 6 as seen in FIG. 10. However, the control piston 6 also may be actuated by means of a separate source of pressurized gas.

The control piston 6 acts simultaneously by way of an air valve stem 10 and an oil valve stem 11 on an air valve plug 7 and a oil valve plug 8, respectively, against the pressures of respective compression springs 7.1 and 8.1. In this manner respective passages for compressed air and pressurized oil are opened so that compressed air may flow directly, while pressurized oil will flow through capillary tubes 28, 29, 30 to be described in greater detail below, across the longitudinal throughbore 4.1 to the respective bores 4.2 and into the two-component nozzles 1.

The control piston 6 is retained in the cylinder 5 by the cylinder cover 5.1, while the valve plugs 7 and 8 are retained in the module body 2 by closure caps 9. The required sealing of the control piston 6 is assured by O-ring seals 15, 17 and that of the valve plugs 7, 8 by O-ring seals 14.

An air adapter 3 and a packing or stuffing box 20 are disposed parallel to each other in the nozzle casing 4, being aligned respectively with the connections 31, 32 in the corresponding bores 31.1 and 32.1. The air adapter 3 comprises a sleeve received in tight fit in its take-up bore. The stuffing box 20 comprises an oil volume limiter 22 embodied by a disc defining a cavity 21, and further comprises a sealing disc 23 and a pressure ring 24. Members 22 to 24 are held together by a clamping screw 25, and a total of three capillary tubes 28, 29, 30 pass through the same, having their open ends protrude into the cavity 21 (see FIGS. 7 and 10). The sealing disc 23 is made of FKM plastics (trade name: Viton).

The other ends of the capillary tubes 28, 29, 30 extend out of the stuffing box 20 into the throughbore 4.1 and then are introduced individually through a respective bore 4.2 each into the corresponding two-component nozzle 1.

Reference numeral 7.2 in FIG. 8 indicates an air bypass from the air space in the air connection 32 bridging the air valve formed by the air valve plug 7 and the air valve stem 10. FIG. 8 shows this valve in closed position. Nevertheless air can flow through the air bypass 7.2 into the air space within the throughbore 4.1 and then continue without obstruction to each of the two-component nozzles 1. In this manner compressed air is available at the two-component nozzle without any delay in time once the control piston 6 is actuated. Together with the air valve, the control piston 6 at the same time opens the oil valve 8, 11, which is not bypassed, by pressing the oil valve stem 11 against the valve plug 8. The latter, therefore, is shifted into an open position against the pressure of the spring 8.1 disposed in its bore so that oil can flow into the cavity 21 and on into the open ends of the capillary tubes 28, 29, 30 and towards the corresponding two-component nozzles 1.

The pressure of the pressurized oil supplied through the oil connection 31 propagates much more rapidly than pressure in air so that hydraulic pressure builds up at sufficient speed in the two-component nozzles as well. The mixture of pressurized oil and pressurized air resulting in the mixing chamber of each two-component nozzle is surrounded by an inner air jacket and an outer air jacket from the two-component nozzle. This mixed jet then is pressed flat from both sides by the jet forming nozzle 36 which is pressurized by the same compressed air. Thus the mixed jet is extended in length to such an extent that the ends of the mixed jets overlap at the spacing c of adjacent two-component nozzles. Thus a metered, very thin oil layer can be sprayed uniformly on a sheet to be deformed which is being advanced at a suitable distance underneath the control module. In this manner a deforming operation, such as punching can be prepared in optimum fashion.

Removal of the closure plugs 33 and coupling of one or more like control modules permits oil to be sprayed across a sufficient width on any strip of sheet material in accordance with any sheet width. Instead of a straight line, adjacent two-component nozzles may be arranged in any pattern which may be predetermined by a shaping tool so that spraying can be carried out in correspondence with the tool profile on a work-piece which in this case is stationary under the control module.

A control module according to the invention can be used advantageously also for cutting jobs where finely dosed spraying without fine dispersion, if at all possible, is desired in the zones of action for oriented simultaneous cooling lubrication of a plurality of zones of action.

The features disclosed in the specification above, in the figures and drawings may be significant for implementing the invention in its various embodiments, both individually and in any combination.

The invention claimed is:

1. A control module for a nozzle arrangement, including at least one two-component nozzle for spraying a gas/liquid mixture on the zones of action between a tool and a work-piece, comprising a gas supply line for pressurized gas and a liquid supply line for pressurized liquid, both leading to the at least one two-component nozzle, a liquid check valve in the liquid supply line, a control device to be actuated by the pressurized gas for opening or closing of the liquid check valve, a packing disposed downstream of the liquid check valve, a branch line in the form of a capillary tube extending from the packing to the at least one two-component nozzle, wherein a gas check valve is provided in the gas supply line, and the control device is designed for opening or closing of the gas check valve together with the liquid check valve.

2. The control module as claimed in claim 1, wherein the control device includes a control piston adapted to be pressurized at one end by pressurized gas and, by its other end, acting mechanically against spring pressure on valve plugs of the liquid and gas check valves.

3. The control module as claimed in claim 1, wherein the at least one two-component nozzle includes a mixing chamber in which liquid and gas are premixed, and an inner air jacket jet is generated which bundles the mixed jet exiting from the nozzle outlet.

4. The control module as claimed in claim 3, wherein an outer air jacket jet is provided in addition.

5. The control module as claimed in claim 1, wherein the at least one two-component nozzle comprises a jet forming attachment including at least one jet forming nozzle which is inclined with respect to the mixed jet exiting from the two-component nozzle.

6. The control module as claimed in claim 5, wherein the jet forming attachment comprises two diagonally opposed jet forming nozzles.

7. The control module as claimed in claim 5, wherein the at least one jet forming nozzle includes an angle a in the range of $90° \leq \alpha \leq 120°$ with respect to the axis of the two-component nozzle.

8. The control module as claimed in claim 5, wherein the at least one jet forming nozzle has a diameter (D) in the range of $1 \text{ mm} \leq D \leq 3 \text{ mm}$.

9. The control module as claimed in claim 1, wherein the inner diameter (d) of the capillary tube lies in the range of $0.2 \text{ mm} \leq d \leq 1.4 \text{ mm}$.

10. The control module as claimed in claim 1, wherein the gas is air and the liquid is an oil selected in accordance with the materials on which it is to be sprayed and the respective shaping technique.

11. Use of a control module as claimed in claim 1 for spraying a mixed jet of gas and liquid on the surface of a workpiece to be-shaped, such as a sheet, to generate a liquid film on said surface, the control module comprising at least two two-component nozzles which are arranged at such spacing from each other that spray patterns of the mixed jets sprayed by the at least two two-component nozzles on the workpiece surface overlap each other.

12. The use as claimed in claim 11, wherein a plurality of control modules are connected in series.

13. The use as claimed in claim 11, wherein up to three two-component nozzles are disposed in a rectilinear row across the travelling direction of a workpiece surface which is moved with respect to the control module during the spraying operation.

14. The use as claimed in claim 11, wherein the at least two two-component nozzles and a workpiece surface to be sprayed on are fixed with respect to each other during the spraying operation, and the at least two two-component nozzles are disposed in a pattern which corresponds to the arrangement of the zones of action between a tool and a workpiece to be shaped.

15. Use of a control module as claimed in claim 1 for spraying a mixed jet of gas and liquid on the zones of action between a workpiece surface and a cutting tool, especially a milling tool.

16. A control module for a nozzle arrangement, including at least one two-component nozzle for spraying a gas/liquid mixture on the zones of action between a tool and a workpiece, comprising a gas supply line for pressurized gas and a liquid supply line for pressurized liquid, both leading to the at least one two-component nozzle, a liquid check valve in the liquid supply line, a control device to be actuated by the pressurized gas for opening or closing of the liquid check valve, a packing disposed downstream of the liquid check valve, a branch line in the form of a capillary tube extending from the packing to the at least one two-component nozzle, wherein the packing includes a cavity defined by a liquid volume limiter and, at the valve-end side, the open ends of the capillary tube pass through a sealing disc and dip into the cavity.

17. The control module as claimed in claim 16, wherein the sealing disc is made of FKM plastics (Viton).

18. A control module for a nozzle arrangement, including at least one two-component nozzle for spraying a gas/liquid mixture on the zones of action between a tool and a workpiece, comprising a gas supply line for pressurized gas and a liquid supply line for pressurized liquid, both leading to the two-component nozzle, a liquid check valve in the liquid supply line, a control device to be actuated by the pressurized gas for opening or closing of the liquid check valve, a packing disposed downstream of the liquid check valve, a branch line in the form of a capillary tube extending from the packing to the at least one two-component nozzle, the packing including a cavity defined by a liquid volume limiter and the open, valve-end side ends of the or each capillary tube dipping into the cavity.

19. The control module as claimed in claim 18, wherein the open, valve-end side ends of the or each capillary tube pass through a sealing disc.

20. The control module as claimed in claim 18, wherein the liquid volume limiter is a cylinder body which has a cylindrical cavity on the side of the cylinder body facing the liquid check valve and is passed through by the or each capillary tubes, and wherein a sealing disc is clamped between the cylinder body and a pressure ring.

21. Use of a control module as claimed in claim 18 for spraying a mixed jet of gas and liquid on the surface of a work-piece to be shaped, such as a sheet, to generate a liquid film on said surface, the control module comprising at least two two-component nozzles which are arranged at such spacing from each other that spray patterns of the mixed jets sprayed by the at least two two-component nozzles on the workpiece surface overlap each other.

22. Use of a control module as claimed in claim 18 for spraying a mixed jet of gas and liquid on the zones of action between a workpiece surface and a cutting tool, especially a milling tool.

23. A control module for a nozzle arrangement, including at least one two-component nozzle for spraying a gas/liquid mixture on the zones of action between a tool and a workpiece, comprising a gas supply line for pressurized gas and a liquid supply line for pressurized liquid, both leading to the at least one two-component nozzle, a liquid check valve in the liquid supply line, a control device to be actuated by the pressurized gas for opening or closing of the liquid check valve, a packing disposed downstream of the liquid check valve, a branch line in the form of a capillary tube extending from the packing to the at least one two-component nozzle, wherein a gas check valve is provided in the gas supply line, and the control device is designed for opening or closing of the gas check valve together with the liquid check valve, and wherein the packing includes a cavity defined by a liquid volume limiter and, at the valve-end side, the open ends of the capillary tube pass through a sealing disc and dip into the cavity.

24. Use of a control module as claimed in claim 23 for spraying a mixed jet of gas and liquid on the zones of action between a workpiece surface and a cutting tool, especially a milling tool.

* * * * *